United States Patent [19]
Lin et al.

[11] Patent Number: 6,047,059
[45] Date of Patent: *Apr. 4, 2000

[54] SYSTEM AND METHOD FOR COMMUNICATING TRANSACTION CAPABILITIES APPLICATION PART INFORMATION

[75] Inventors: Ching-Der Lin, Plano; John L. Whited, Richardson; Comandur S. Kannan, Plano, all of Tex.

[73] Assignee: Alcatel USA Sourcing, L.P., Plano, Tex.

[ * ] Notice: This patent is subject to a terminal disclaimer.

[21] Appl. No.: 08/917,674

[22] Filed: Aug. 21, 1997

[51] Int. Cl.[7] .............................. H04M 3/42; G06F 9/45
[52] U.S. Cl. .......................... 379/230; 379/207; 395/701
[58] Field of Search .................... 379/201, 207, 379/219, 220, 229, 230; 395/701

[56] References Cited

U.S. PATENT DOCUMENTS

| | | | |
|---|---|---|---|
| 5,487,141 | 1/1996 | Cain et al. | 395/135 |
| 5,574,782 | 11/1996 | Baird et al. | 379/220 |
| 5,640,446 | 6/1997 | Everett et al. | 379/115 |
| 5,768,361 | 6/1998 | Cowgill | 379/229 |
| 5,799,192 | 8/1998 | Yasuda | 395/701 |
| 5,974,252 | 10/1999 | Lin et al. | 395/701 |

FOREIGN PATENT DOCUMENTS 9534175  12/1995  WIPO .............................. H04Q 3/00

OTHER PUBLICATIONS

M. Genette, et al., "Intelligent Network: The Service Creation Environment", Commutation & Transmission, vol. 17, No. 2, Jan. 1, 1995, pp. 13–20.

B. Ku, "A Reuse–Driven Approach for Rapid Telephone Service Creation", International Conference on Software REuse, Nov. 1, 1994, pp. 64–72.

E. Pentcheva, "An Object–Oriented Data Model for Intelligent Network Services", Electronics, Circuits, and Systems 1996. ICECS '96., Proceedings of the Third IEEE International Conference, Oct. 16, 1996, pp. 303–306, vol. 1.

F. Yegenoglu, et al., "Transaction Capabilities Application Part and Intelligent Network Services", Discovering a New World of Communications, Chicago, Jun. 14–18, 1992, pp. 0582–0586.

*Primary Examiner*—Scott Wolinsky
*Attorney, Agent, or Firm*—Baker Botts L.L.P.

[57] ABSTRACT

A method of processing transaction capabilities application part information in an intelligent network includes transmitting transaction capabilities application information from a first node in the intelligent network to a second node in the intelligent network and providing a transaction capabilities application part message definition having a plurality of messages and parameters defining a parameter structure for transaction capabilities application part communication. The method also includes accessing the transaction capabilities application part message definition to determine the parameter structure for the provided transaction capabilities application part information and, in response to the content of the transaction capabilities application part information and the parameter structure, executing an executable algorithm operable to process transaction capabilities application part messages having the parameter structure defined by the transaction capabilities application part definition.

25 Claims, 6 Drawing Sheets

```
SEQUENCE InfoAnalyzed {
    ...
    { calledPartyID 15 CalledPartyID OPT }
    ...
}
...
USER_DEFINE CalledPartyID    AINDigits
BITFIELD AINDigits {
    { odd_even BIT_DGT_ODDEVEN 1 }
    { nat_of_num BIT_ENUM 7 }
    { spare BIT_NULL 1 }
    { num_plan BIT_ENUM 3 }
    { pri BIT_ENUM 2 }
    { si BIT_ENUM 2 }
    { digits BIT_DGT 1 64 odd_even }
}
```

```
EXTDEF_PARAM: Var: integer_type_id calledPartyID.odd_even CalledPID_odd_even alloc_call Edt: 001
EXTDEF_PARAM: Var: integer_type_id calledPartyID.nat_of_num CalledPID_nat_of_num alloc_call Edt: 001
EXTDEF_PARAM: Var: integer_type_id calledPartyID.spare CalledPID_spare alloc_call Edt: 001
EXTDEF_PARAM: Var: integer_type_id calledPartyID.num_plan CalledPID_num_plan alloc_call Edt: 001
EXTDEF_PARAM: Var: integer_type_id calledPartyID.pri CalledPID_pri alloc_call Edt: 001
EXTDEF_PARAM: Var: integer_type_id calledPartyID.si CalledPID_si alloc_call Edt:001
EXTDEF_PARAM: Var: phone_nr_type_id calledPartyID.digits CalledPID_digits alloc_call Edt:001
```

FIG. 7

```
SIB Code: ACTION 4
SIB_Type: SIB_action_get action_get
SIB_Expr: Var: integer_type_id """"calledPartyID.nat_of_num"
"CalledPID_nat_of_num""alloc_call"""""" Edt: 17 Vql: 0 Desc: CALLEDPARTYID
SIB_Expr: Var: integer_type_id """"calledPartyID.num_plan" "CalledPID_num_plan"
"alloc_call"""""" Edt: 17 Vql: 0 Desc: CALLEDPARTYID
SIB_Expr: Var: integer_type_id """"calledPartyID.pri" "CalledPID_pri" "alloc_call"
"""""" Edt: 17 Vql: 0 Desc: CALLEDPARTYID
SIB_Expr: Var: integer_type_id """"calledPartyID.si" "CalledPID_si" "alloc_call"
"""""" Edt: 17 Vql: 0 Desc: CALLEDPARTYID
SIB_Expr: Var: phone_nr_type_id """"calledPartyID.digits" "CalledPID_digits"
"alloc_call"""""" Edt: 17 Vql: 0 Desc: CALLEDPARTYID
SIB_Expc: IntoAnalyzed
```

SYSTEM AND METHOD FOR COMMUNICATING TRANSACTION CAPABILITIES APPLICATION PART INFORMATION

RELATED APPLICATIONS

This application is related to a application, entitled System and Method for Implementing Programmable Transaction Capabilities Application Part Communication Protocol, having a Ser. No. of 08/918,693 filed on Aug. 21, 1997 and issued as U.S. Pat. No. 5,974,252 on Oct. 26, 1999.

TECHNICAL FIELD OF THE INVENTION

This invention is related in general to the field of telecommunications systems. More particularly, the invention is related to a system and method for a programmable transaction capabilities application part application protocol.

BACKGROUND OF THE INVENTION

The public telecommunications network makes extensive use of signaling system number 7 (SS7) protocol to communicate among the various network elements. End to end routing of a signaling system number 7 message often requires the use of the transaction capabilities application part (TCAP) portion of the signaling system number 7 protocol. The transaction capabilities application part enables the deployment of advanced intelligent network services by supporting non-circuit related information exchange between signaling points. For example, a service switching point (SSP) uses the transaction capabilities application part to query a service control point (SCP) to determine the routing number associated with a dialed 800, 888, or 900 number. The service control point uses the transaction capabilities application part to return back to the service switching point a response containing the routing number. Calling card calls are also validated using transaction capabilities application part query and response messages. Furthermore, when a mobile subscriber roams into a new mobile switching center area, an integrated visitor location register may request service profile information from a subscriber's home location register using information carried within transaction capabilities application part messages.

Communication of transaction capabilities application part messages between two or more nodes in an intelligent network conventionally takes place using an application protocol defined by standard committees such as Bellcore or ETSI. Two such application protocols are INAP, defined by ETSI and AIN 0.1, defined by Bellcore. Each application protocol has a message set that defines how information is communicated between intelligent network nodes. The message set for an application protocol is specified by a standards committee in such a way as to give the service provider some message content flexibility. Therefore, for some message fields, the service provider may define the content of the message fields. Because each application protocol developed for each customer uses some message information that is customer specific, message information for an application protocol is typically defined in the source code of the programs using the application protocol.

Because customer specific message information is contained in the source code of programs using an application protocol, it is possible that several versions of an application protocol used for transaction capabilities application part messages must be maintained. Creating and maintaining multiple source code versions of the same application protocol adds complexity and requires additional development resources. Furthermore, modifications to any particular customers application protocol are cumbersome because they require changes to the source code of the programs using the application protocol. In today's fast-paced telecommunications environment, this tedious and time-consuming service implementation method is unacceptable.

SUMMARY OF THE INVENTION

Accordingly, a need has arisen for a method and system for communicating transaction capabilities application part information that address the shortcoming of prior systems and methods. Thus the teachings of the present invention provide a system and method for communicating transaction capabilities application part information.

According to one embodiment of the invention, a method of processing transaction capabilities application part information in an intelligent network includes transmitting transaction capabilities application information from a first node in the intelligent network to a second node in the intelligent network and providing a transaction capabilities application part message definition having a plurality of messages and parameters defining a parameter structure for transaction capabilities application part communication. The method also includes accessing the transaction capabilities application part message definition to determine the parameter structure for the provided transaction capabilities application part message and, in response to the content of the transaction capabilities application part message and the parameter structure, executing an executable algorithm operable to process transaction capabilities application part messages having the parameter structure defined by the transaction capabilities application part definition.

According to another embodiment of the invention, a communications network includes a transaction capabilities application part message definition defining a transaction capabilities application part parameter structure. The communications network also includes a first node and a second node. The second node is in communication with the first node. The second node includes a service logic interpreter that is operable to receive transaction capabilities application part messages from the first node, access the transaction capabilities application part message definition, select an executable algorithm for execution based on the content of the transaction capabilities application part message definition, and execute the executable algorithm. The executable algorithm has a parameter structure defined by the transaction capabilities application part message definition.

The invention provides several technical advantages. For example, an application protocol is provided that does not require recoding the program that executes tasks associated with transaction capabilities application part messages. This reduces complexity and the need for additional development resources. Furthermore, because the definition of an application protocol is not done at compilation time, users such as a service creation environment (SCE) or a service control point (SCP) are no longer required to put protocol specific information in the source code of programs developed by those users. Moreover, service independent building blocks no longer rely on source code specification of parameters. Thus no service independent building block source code changes are required to change message parameters or a protocol definition. In addition, because service independent building blocks use parameter definitions provided according to teachings of the invention, service designers have access to all parameters defined for a message in the application protocol when designing services using a service creation environment.

Furthermore, according to the invention, access is provided to all of an application protocol's messages through the use of just four service independent building blocks. Thus adding messages or parameters to an application protocol does not require any service creation environment or service independent building block code changes.

BRIEF DESCRIPTION OF THE DRAWINGS

For a better understanding of the present invention, reference may be made to the accompanying drawings, in which.

DETAILED DESCRIPTION OF THE INVENTION

Embodiments of the present invention are illustrated in FIGS. 1 through 10, like reference numerals being used to refer to like and corresponding parts of the various drawings.

Figure 1:
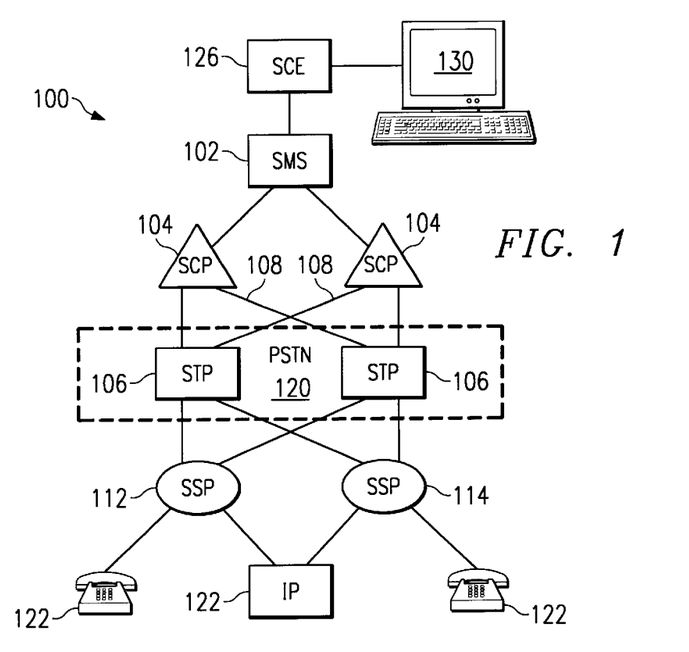
FIG. 1 is a block diagram of an exemplary telecommunications network such as an advanced intelligent network (AIN)

FIG. 1 is a block diagram of a telecommunications network 100 such as an advanced intelligent network (AIN). Network 100 includes a service management system 102 that interfaces with a plurality of service control points (SCP) 104 and a plurality of signal transfer points (STP) 106 via an industry standard protocol, such as X.25. Service management system 102 provides network information, database management, and administrative support for network 100. Service management system 102 generally interfaces with service control points 104 for provisioning, database management, service control point application program management, and collecting traffic metering and measurement data. Service control points 104 are also directly linked to signal transfer points 106 via a signaling system number 7 (SS7) linkset 108. Signal transfer points 106 are further coupled through signaling system number 7 linkset 108 to one or more service switching points 112 and 114, which perform switching and call-handling functions in the network. Service control points 104 are transaction-based processing systems whose primary responsibility is to respond to queries from service switching points 112 and 114 for data needed to complete routing a call. Service switching points 112 and 114 are part of the public switched telephone network (PSTN) 120 and are coupled to the telephone service subscribers or customers 122, which includes wire-based telephones, wireless telephones, and intelligent peripherals 122.

The creation and delivery of service logic programs (SLPs) is the function of a service creation environment (SCE) 126, which is coupled to service management system 102. Service creation environment 126 allows users and programmers to create service logic programs that define the desired advance intelligent network service processing. These programs may then be downloaded to service control points 104 and signal transfer points 106 through service management system 102 for execution. Service logic programs define the triggering events encountered in service switching points 112 and 114 that require database access and logic for additional processing of telephone calls. Users and programmers of service creation environment 126 may interface with service creation environment 126 through a computer terminal 130 coupled to service creation environment 126.

Service independent building blocks (SIBs) are building blocks that have been developed to construct service logic programs to implement network services. The service independent building blocks, as defined in the International Telecommunications Union CCITT ITU-T Q.1213, are used in the service creation environment to produce service logic programs that are then downloaded to service management system 102, service control point 104, and/or signal transfer points 106, where they are executed.

Figure 2A:
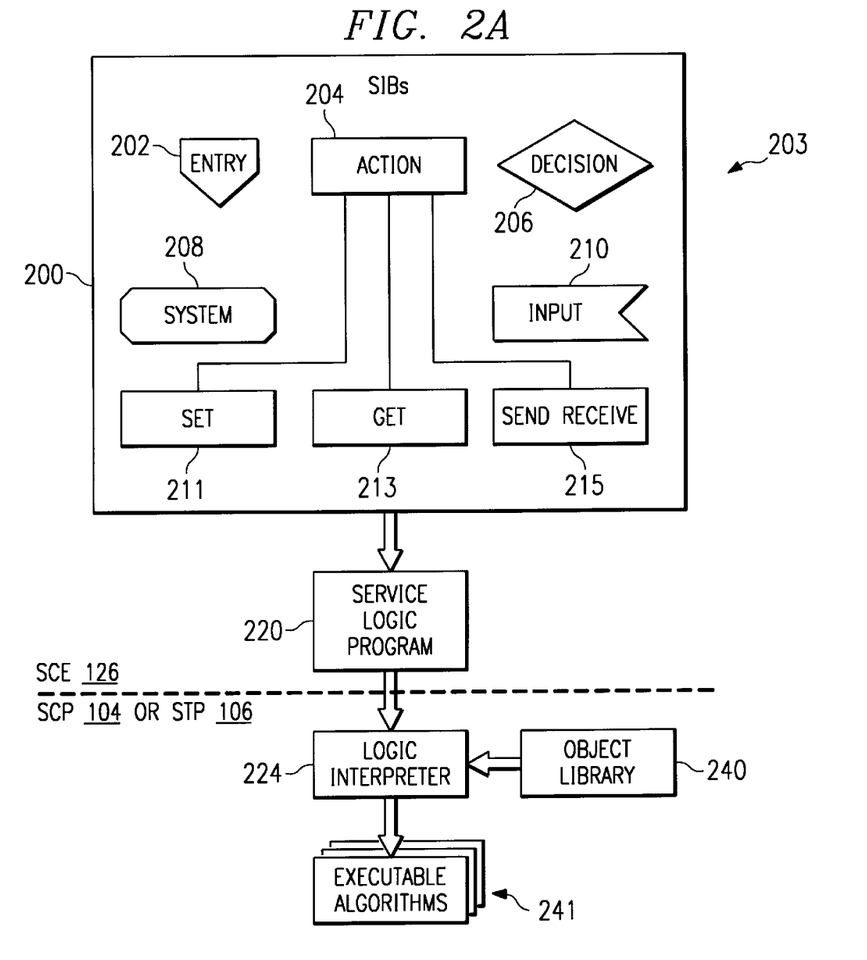
FIG. 2A is a simplified block diagram illustrating the use of service independent building blocks (SIBs)
Figure 5:
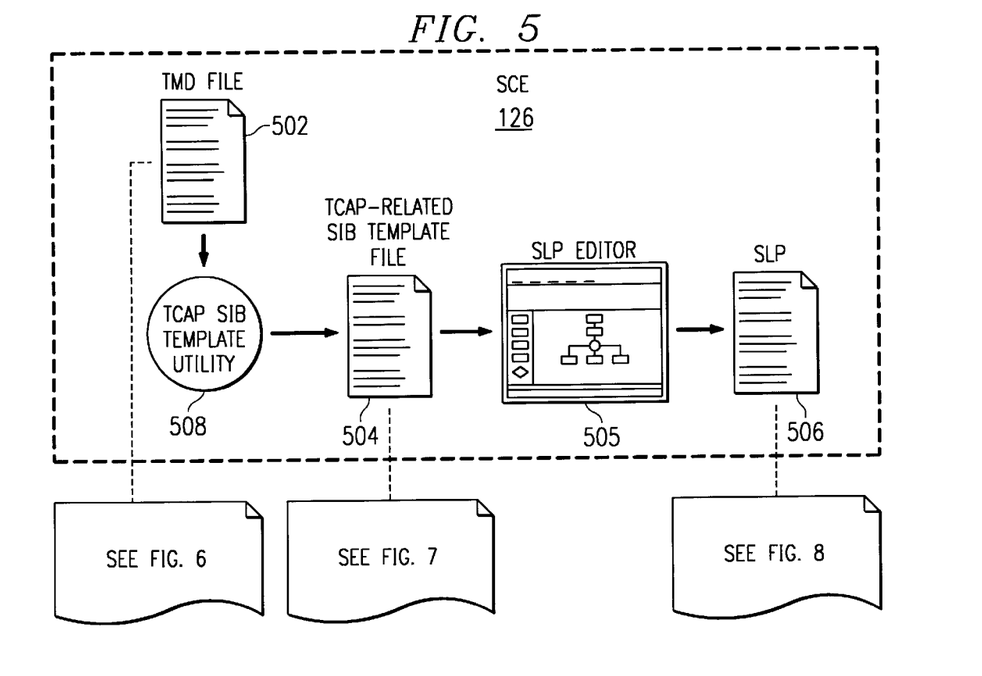
FIG. 5 is a simplified block diagram showing the creation of services associated with transaction capabilities application part messages using an application protocol defined according to the teachings of the invention.

FIG. 2A is a simplified block diagram illustrating the use of service independent building blocks (SIBs). Several different classes or types of service independent building blocks 200 are illustrated in FIG. 2, including Entry 202, Action 204, Decision 206, System 208, and Input 210. Three types of action service independent building blocks 204 are Set 211, Get 213, and SendReceive 215. These different classes of service independent building blocks, which are collectively illustrated through icons 203, can be linked to form a service logic program 220. In a preferred embodiment, a graphical editor may be used to facilitate the creation of service logic programs 220. An example graphical editor 505 is illustrated in FIG. 5. Icons 203 of service independent building block classes may then be picked up and dropped into a workplace and are linked together to form a service logic program such as service logic program 220. An ASCII text file is then created from the linked service independent building block, which is converted to an executable algorithm 241 by a logic interpreter 224. As discussed in greater detail below, an object library 240 may be used to facilitate generation of executable algorithms 241. When executable algorithm 241 is executed, instances of each class of service independent building blocks are created, which have the same behaviors and functionality defined by the class. In this manner, the same code for the same service independent building blocks may be reused in many logic programs without duplicating the effort to recode the logic.

Figure 2B:
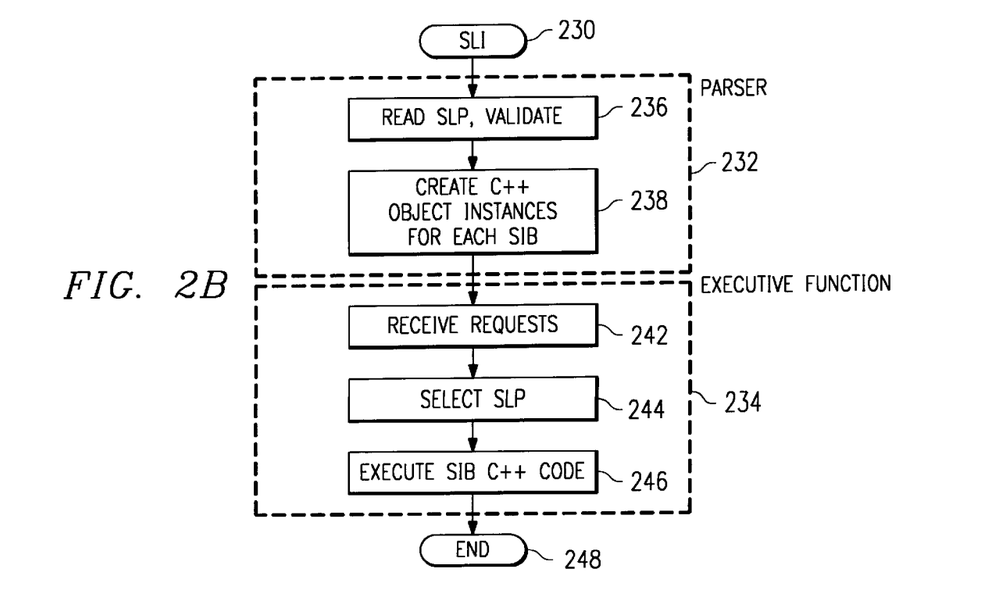
FIG. 2B is a simplified flow chart of an embodiment of a logic interpretation process.

FIG. 2B is a simplified flowchart of an embodiment of the logic interpretation process 230. Logic interpreter 224 or process 230 therefore may include two components: a parser 232 and an execution function 234. Parser 232 first reads service logic program 220 and validates, as shown in step 236. Thereafter, parser 232 creates an instance of a C++ object for each service independent building block by accessing previously generated C++ object classes for templates stored in a C++ object library 240, as shown in step 238. These instances are linked to form an executable algorithm 241.

During run time, execution function 234 receives queries or requests, and selects the appropriate C++ logic program to perform the necessary functions requested. The selected logic programs in C++ are then executed to handle transaction capabilities application part services. The process flow terminates in step 248. In this manner, the same C++ code for the same service independent building block may be reused in many transaction capabilities application part logic programs without duplicating the effort to recode the logic.

Figure 3:
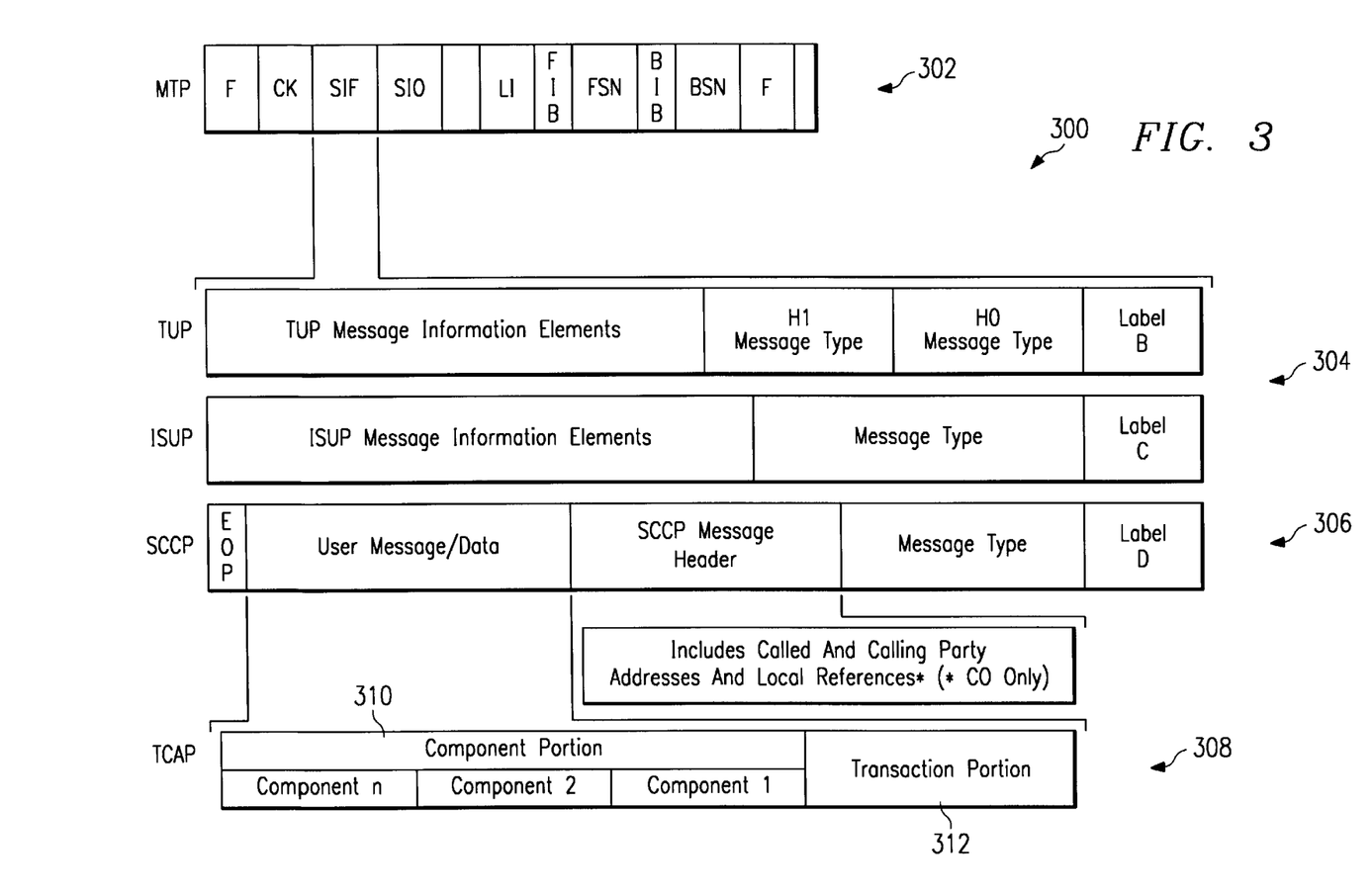
FIG. 3 is a block diagram of a signaling system number 7 (SS7) message structure used in the telecommunications network illustrated in FIG. 1.

FIG. 3 is a block diagram of a signaling system number 7 (SS7) message structure 300. As illustrated, signaling system number 7 message structure 300 has a message transfer part (MTP) 302, user parts 304, a signaling connection control part (SCCP) 306, and a transaction capabilities application part (TCAP) 308. The message transfer part 302 contains necessary mechanisms to insure reliable transmission of functional signaling messages. The signaling connection control part 306 provides the means to control logical signaling connections in the network and transfer signaling data units across a network. Signaling connection control part 306 also provides a routing and translation function that allows signaling messages to be routed to a signaling point. Transaction capabilities application part 308 provides the means to exchange operations and replies via a dialogue. Transaction capabilities application part 308 provides the means to establish non-circuit related communication between two nodes in the signaling network.

As illustrated, transaction capabilities application part 308 contains a component portion 310 and a transaction portion 312. Transaction portion 312 contains a package type identifier. Package types include: unidirectional query with permission, query without permission, response, conversation with permission, conversation without permission, and abort.

A unidirectional package type transfers components in one direction only. A query without permission package type initiates a transaction capabilities application part 308 transaction, such as a 1-800 query. In a query with permission package type, the destination node may end the transaction. A query without permission package type initiates transaction capabilities application part 308 transaction in which a destination node may not end the transaction. A response package type ends transaction capability application part 308 transaction. For example, a response to a 1-800 query with permission may contain the routing number associated with the 800 number. A conversation with permission package type continues a transaction capabilities application part transaction. In a conversation without permission package type, the destination node may end the transaction. A conversation without permission package type continues a transaction capabilities application part transaction. In such a case, the destination node may not end the transaction. An abort package type terminates a transaction due to an abnormal situation. In addition to containing package type identifiers, transaction portion 312 also contains an originating transaction identification and a responding transaction identification field, which associate the transaction capabilities application part 308 transaction with a specific application at the originating and destination signaling points respectively.

Component portion 310 of transaction capabilities application part 308 contains components. Types of components include invoke (last), invoke (not last), return result (last), return result (not last), return error, and reject. Components include numbers representing parameters associated with a transaction capabilities application part message. Because such parameters may be customer-specific, conventionally, each time a customer would request additional capabilities, the protocol for receiving transaction capabilities application part messages had to be modified each time a service was added. The present invention addresses this disadvantage by providing a system and method for adding or modifying the services available to a customer without modifying the application protocol associated with these services.

The invoke (last) component invokes an operation. For example, a query with permission transaction may include an invoke (last) component to request a service control point translation of a dialed number. The invoke (not last) component is similar to the invoke (last) component except that it is followed by one or more components. The return result (last) returns the results of an invoked operation, and the return result (not last) returns the results of an invoked operation but followed by one or more components. The return error component reports an unsuccessful completion of an invoked operation, and the reject component indicates that an incorrect package type or component was received.

Figure 4:
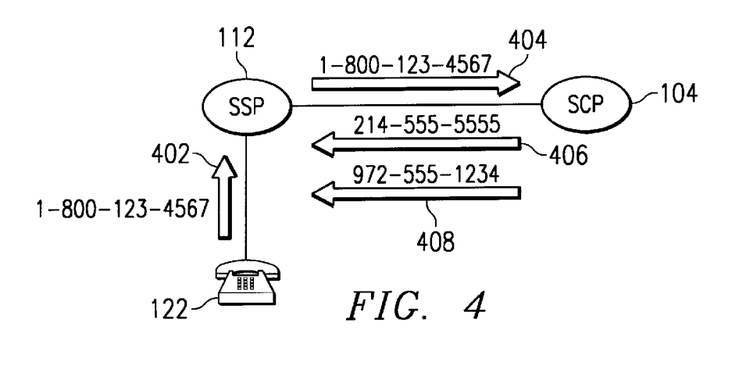
FIG. 4 is a simplified block diagram illustrating one example of a transaction capabilities application parts message.

FIG. 4 is a simplified block diagram illustrating an example of a transaction capabilities application parts message transmitted between service switching point 112 and service control point 104. As described above, transaction capabilities application part 308 enables the deployment of advanced intelligent network services by supporting non-circuit related information exchange between signaling points. In the example illustrated in FIG. 4, a telephone call is placed using telephone 122 to a 1-800 number 402. In response to receiving dialed 1-800 number 402, service switching point 112 transmits a transaction capabilities application part query message 404 to query service control point 104 to determine the routing number associated with dialed 1-800 number 402. Service control point 104 returns back to service switching point 112 a transaction capabilities application part, response message 406, 408 containing the routing number. Query message 404 and response message 406, 408 are examples of transaction capabilities application part 308 messages. As illustrated, the routing number returned may vary depending upon the time of day or the location from which the dialed 1-800 number 402 was received. Once the service switching point receives response 406, 408 containing a routing number, service switching point 112 may route dialed 1-800 number 402 to the correct location based on response 406, 408. Thus, transaction capabilities application part 308 messages enable the deployment of advanced intelligent network services by supporting non-circuit related information exchange.

Another example of an advanced intelligent network service provided through a transaction capabilities application part 308 message is roaming. As a mobile telephone moves between new roaming areas, a local visitor location register requests service profile information from the mobile telephone user's home location register. This request is performed using information carried within a transaction capabilities application part 308 message.

The transaction capabilities application part 308 messages associated with services such as 1-800 routing and roaming are transmitted between service switching point 112 and service control point 104 according to an application protocol defined for a given customer. Conventionally, such an application protocol specifies the format for transmitting and receiving a transaction capabilities application part 308 message, such as query message 404 or response message 406, 408. This specification is conventionally performed by a trigger integer, which specifies a type of message, and a series of integers following the trigger integer in a particular order that corresponds to various parameters associated with the message. If additional services are desired by a given customer, however, difficulties arise. For example, the application protocol for a given customer must be modified to include a protocol for the new service. In addition, the application programs executing the given service must be modified to correspond to that new protocol. If a service is modified to include, for example additional parameters associated with an existing service, both the application protocol and the associated service logic programs have to be modified to reflect changes in the application protocol resulting from changes in the service. Conventionally, such modifications require computer code changes that are time consuming. In addition, conventionally service logic interpreter 224 must be modified to be able to parse and execute the modified service logic programs 220. According to the invention, services using transaction capabilities application part 308 messages may be easily added or modified for a given customer without the need for modifying the code associated with the service and without modifying service logic interpreter 224.

Figure 6:
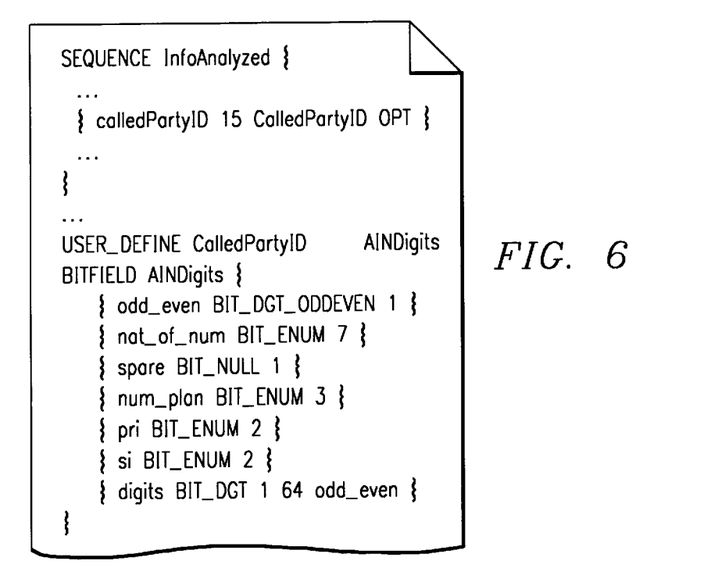
FIG. 6 is exemplary details of the transaction capabilities application part message definition file illustrated in FIG. 4.
Figure 7:
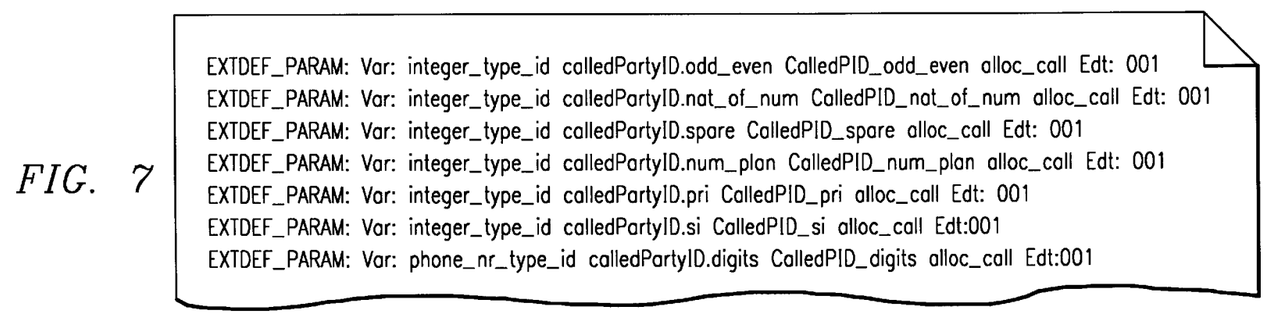
FIG. 7 is exemplary details of the service independent building block template file illustrated in FIG. 4.
Figure 8:
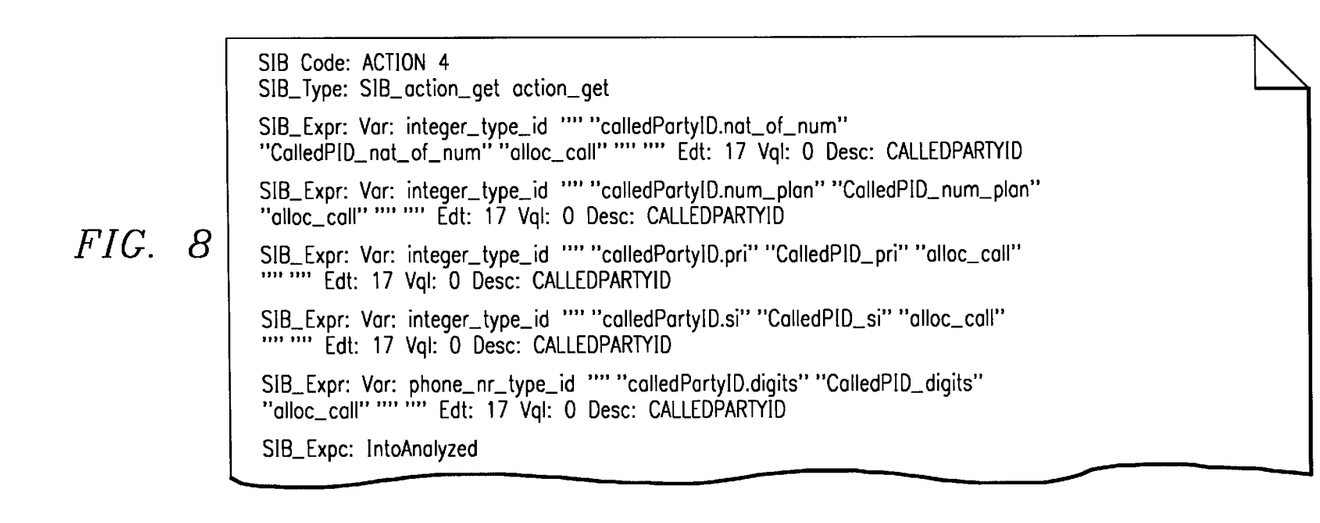
FIG. 8 is exemplary details of a portion of a service logic program.

FIG. 5 illustrates a simplified block diagram showing the creation of executable algorithms associated with transaction capabilities application part 308 messages according to the teachings of the invention. FIGS. 6 through 8 illustrate exemplary details of various components of the block diagram illustrated in FIG. 5. The illustrated steps may be performed within service creation environment 126 to create service independent building blocks, such as service independent building blocks 203, that may be linked together to form a service logic program, such as service logic program 220. Service logic program 220 may then be used by a service logic interpreter, such as service logic interpreter 224, to generate executable algorithms, such as executable algorithms 241, which are used by service control points 104 and/or service switching points 112 to communicate transaction capabilities application part messages.

As illustrated in FIG. 5, service creation environment 126 includes a transaction capabilities application part message definition file (TMD File) 502. As described in greater detail below, transaction capabilities application part message definition file 502 contains all transaction capabilities application part messages available to a given customer. Transaction capabilities application part message definition file 502 also defines the parameters associated with each message. In addition, transaction capabilities application part message definition file 502 also associates a tag integer with a respective message. A tag integer associated with a given transaction capabilities application part message definition file 502 may be received by service control point 104 rather than the actual name of the desired message.

Service creation environment 126 also may include a utility 508 that creates, based on transaction capabilities application part message definition file 502, a service independent building block template file 504. As described in greater detail below, service independent building block template file 504 associates particular parameters defined in transaction capabilities application part message definition file 502 with variable names that are used by a designer in constructing a service logic program, such as service logic program 220.

Service creation environment 126 also may include a service logic program graphical editor 505 for facilitating generation of a service logic program 506. By utilizing service logic program graphical editor 505, a service designer may link together a plurality of service independent building blocks that incorporate the contents of service independent building block template file 504 to form service logic program 506. As described above, service independent building block template file 504 associates particular parameters associated with the messages contained in transaction capabilities application part message definition file 502 with service logic program variables names used during the creation of service logic program 506 and during execution of service logic program 506.

Prior to the teachings of the present invention, a service designer utilizing a service creation environment for service creation used dedicated service independent building blocks, one for each message type, that had parameter information imbedded in the source code of the dedicated service independent building blocks. Adding messages to accommodate new services or additional parameters to existing messages required changing the source code of the service independent building blocks. The source code of the service independent building block conventionally included information specifying the parameters that were associated with particular messages and the structure of the associated parameters. Therefore, adding or modifying services, which conventionally resulted in a modification of the application protocol associated with transaction capabilities application part 308 messages, conventionally required rewriting the source code of the service independent building blocks to reflect the change in protocol. In addition, each time a new service independent building block was added, service logic interpreter 224 required modification to be able to execute the newly-added or newly-modified service independent building block.

By contrast, according to an embodiment of the invention and as described in greater detail below, service creation environment 126 provides access to all of an application protocol's messages and parameters through the use of four service independent building blocks, including access to subsequently-developed messages and parameters. These service independent building blocks are Entry 202, Set 211, Get 213, and SendReceive 215, illustrated in FIG. 2A. Adding messages or parameters to an application protocol does not require any service creation environment or service independent building block code changes.

An embodiment of the invention provides an application protocol that uses a fully qualified name and a parameter structure to specify a parameter. According to one embodiment of the present invention, a fully qualified name is an ASCII text string of period-delimited parameter names that specifies a parameter that cannot be further subdivided to other parameters. Such a parameter is referred to as a leaf-node parameter. For example, as illustrated in the last line of FIG. 7, the term "calledPartyID.digits" is a parameter that specifies the digits associated with the phone number of a calling party. Other leaf-node parameters or fully qualified names illustrated in FIG. 7 include "calledPartyID.odd_ even", "calledPartyID.nat_of num", "calledPartyID.spare", "calledPartyID.num_plan", "calledPartyID.pri", and "CalledPartyID.si." By contrast, conventionally, a parameter such as "callingPartyID" would be specified by an integer string with specified portions of the string corresponding to each of the above-listed parameters.

FIG. 6 illustrates exemplary details of a portion of transaction capabilities application part message definition file 502. A more complete listing of an example transaction capabilities application part message definition file 502 is provided in Table 1. Transaction capabilities application part message definition file 502 is an ASCII file that is used to specify a transaction capabilities application part application protocol, which may be written, for example, in Tcl syntax. Tcl is a high-level scripting language known in the industry. Each transaction capabilities application part message definition file 502 contains the definition of a single transaction capabilities application part application protocol. Examples of Tcl commands related to the present invention that are used to describe an application protocol are: PROTOCOL, OCTSTR, and SEQUENCE. PROTOCOL defines messages supported by the protocol; OCTSTR defines ASN.1 octet-string-type parameters; and SEQUENCE defines ASN.1 sequence-type parameters. The parameter reference structure defined in transaction capabilities application part message definition file 502 contains information relating to a message and its specified parameters. Based on the parameter reference structure contained in transaction capabilities application message definition file 502, upon execution of an executable algorithm such as executable algorithms 241, a service logic interpreter can access parameter values for use in processing transaction capabilities application part 308 messages.

As illustrated in FIG. 6, the term "SEQUENCE" specifies a data type for a transaction capabilities application part 308 message "InfoAnalyzed." The term "calledPartyID" is a parameter and the phrase "CalledPartyID OPT" specifies an optional data type for calledPartyID. The integer "15" is a tag associated with the parameter calledPartyID. A transaction capabilities application part message received at, for example, service control point 104, may include such a tag rather than the name of the desired message. Upon reception of a transaction capabilities application part message 508, service control point 104, transaction capabilities application part message definition file 502 is accessed to associate the received tag with its associated message and parameters specified in transaction capabilities application part message definition file 502. The phrase "USER_DEFINE CalledPartyID AINDigits" initiates definition of the user-defined data type "CalledPartyID." The phrase "BITFIELD AINDigits" defines seven leaf-node parameters associated with parameter called the party ID.

To change parameters for a given service or to add additional messages, transaction capabilities application part message definition (TMD) file 502 is modified. A starting point for creating transaction capabilities application part message definition file 502 may be a document that defines a standard application protocol using ASN.1 grammar. An example of such a document is a standard specified by Bellcore. A customer may then supply a customer-specific definition of parameters that may be used to supplement the standard committee document to create the TMD file.

As illustrated in FIG. 5, a service independent building block template file 504 may be derived from transaction capabilities application part message definition file 502. One way of generating a service independent building block template file 504 is through the use of a utility 508, which generates service independent building block template file 504 from transaction capabilities application part message definition file 502. As described above, service independent building block template file 504 associates the fully qualified names of "leaf-node" parameters of the application protocol specified within the transaction capabilities application part message definition file 502 with corresponding service logic program variable names that may be used by a service designer in service creation environment 126 to create a service logic program such as service logic program 220.

FIG. 7 illustrates example portions of service independent building block template file 504, which shows examples of fully qualified names identifying leaf-node parameters and their corresponding service independent building block variable. For example, the last line of information in FIG. 7 reads "EXTDEF_PARAM:Var: phone_nr_type_id calledPartyID.digits CalledPID_digits alloc_call Edt:001." This command associates the fully qualified name "CalledPartyID.digits" with the variable name "CalledPIP_digits" that may be used by a service designer in creating service logic program 506. Associating a fully qualified name of a leaf-node parameter with a variable name that may be used by service designer in creating a service logic program, such as service logic program 506, enables a service designer to utilize variable names with which he is familiar and also allows the use of short, easy-to-remember variable names. As an intermediate step in generating service independent building block template 504, a "dot" file listing all fully qualified names that may be generated from transaction capabilities message definition file 502 may be generated. An example of such a file is provided in Table 2.

Service independent building block template file 504 may be used by service logic program graphical editor 505 for creating service logic programs, such as service logic program 506, which is analogous to service logic program 220. Service logic program 506 incorporates the application protocol defined in the transaction capabilities application part message definition file 502 by associating the leaf-node parameters obtained from transaction capabilities application part message definition file 502 with service logic program variable names.

To generate service logic program 506, a service designer may link multiple service independent building blocks, such as service independent building blocks 203, to form service logic program 506. As described above, four service independent building blocks are particularly important to generating service logic programs used for transaction capabilities application part messages. These four service independent building blocks are Entry 202, Set 211, Get 213 and SendReceive 215. Service independent building block Get 213 retrieves the value of each parameter associated with a received message. Service independent building block Set 211 assigns values to parameters associated with a chosen message. Service independent building block Entry 202 is the entry point to a service independent building block upon receipt of a transaction capabilities application part message. Service independent building block SendReceive 215 is used to send and receive TCAP messages.

As an example, a service designer may use the service independent building block Get 213 to retrieve a value associated with a parameter associated with an InfoAnalyzed message. To do so, during creation of a service logic program for use with an InfoAnalyzed message, the service logic designer may select the message InfoAnalyzed from a menu provided by service independent building block Get 213 that lists all possible messages available with a given transaction capabilities part protocol specified by transaction capability application part message definition file 502. Selecting a message incorporates the parameters associated with that message into the service independent building block Get 213 for use in a resulting service logic program. In such a manner, service logic programs may be easily created to include new messages contained within transaction capabilities application part message definition file 502 or new parameters associated with messages contained in transaction capabilities application part message definition file 502.

Once creation of service logic program 506 is completed, it can be executed by a service logic interpreter 224 within, for example, service control point 104 (FIG. 9) to process transaction capabilities application part 308 messages received from or sent to, for example, service switching points 112 and 114. Upon execution of service logic program 506, service logic interpreter 224 creates service independent building block objects based on the content of the service logic program 506 being processed. Each service independent building block object, when constructed, incorporates the application protocol specified by transaction capabilities application part message definition file 502.

FIG. 8 illustrates and details of a portion of service logic program 506. FIG. 8 shows commands associated with one service independent building block that is included in a portion of service logic program 506. Service logic program 506 may include a plurality of service independent building blocks that may be linked together using service logic program graphical editor 505. A portion of service logic program illustrated in FIG. 8 associates a fully qualified name for a leaf-node parameter based on service independent building block template file 504. The purpose of service logic program 506 is to define the parameters that may be associated with a given message, such as, for example, InfoAnalyzed, to define the types of variables associates with the parameters, and to define the type of action associated with the specified message. For example, the first line of service logic program 506, which reads "SIB Code: ACTION 4", specifies that the class of the service independent building block is "action" and also specifies the service independent building block identification number associated with the service independent building block. In this case, the service independent identification number is 4, which corresponds to this particular service independent building block being the fourth service independent building block generated in the current service logic program. The second line of service logic program, which reads "SIB_Type: SIB_action_get action_get", specifies that the particular type of action for this service independent building block is a get action. Except for the last line of information, the additional lines of information are associated with the leaf-node parameters associated with the message InfoAnalyzed. These lines of information specify the variable type associated with a leaf-node parameter and also associate a leaf-node parameter with a variable name that may be used by a service designer in service creation environment 126 based upon the service independent building block template file 504. For example, the third line in FIG. 8 specifies that the leaf-node parameter, having a fully qualified name of "CalledPartyID.nat_of_num", has an integer type in that it is associated with the variable name "CalledPID_nat_of num" that may be used by a service designer and service creation environment 126. The last line of the service independent building block illustrated in FIG. 8 specifies the message associated with the service independent building block. As illustrated in FIG. 8, the service independent building block is associated with an InfoAnalyzed message.

Thus, according to one embodiment of the invention, service logic programs such as service logic program 506 may be created based on transaction capabilities application part message definition file 502 that incorporate the parameter reference structure specified by transaction capabilities application part message definition file 502 and that associate a fully-qualified name for a leaf-node parameter with a service logic program variable. As described in greater detail below, this allows execution of executable algorithms 241 without rewriting the code for service logic interpreter 224 each time an additional message or a modified message is desired.

Figure 9:
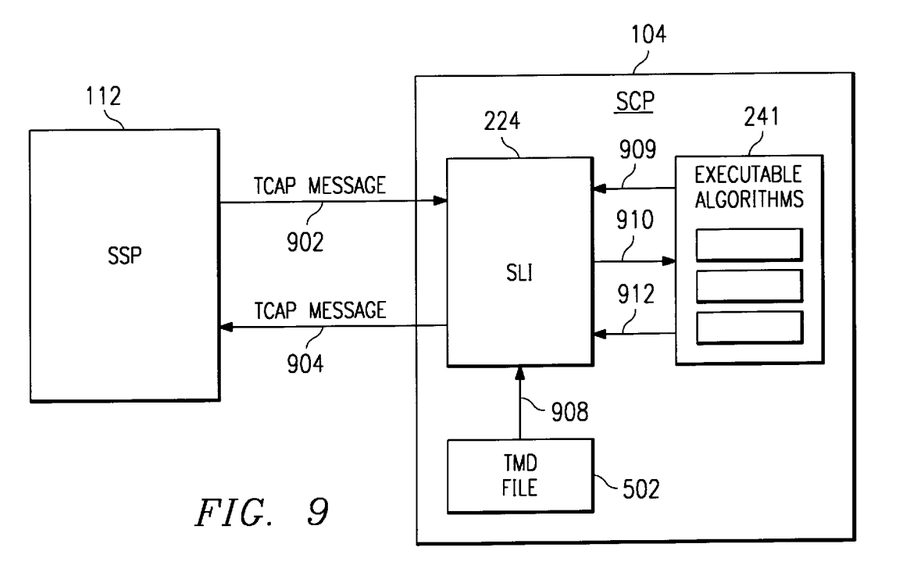
FIG. 9 is a block diagram illustrating the handling of a service associated with a transaction capabilities application part message.

FIG. 9 illustrates the execution of executable algorithms 241 by service logic interpreter 224 according to the teachings of the present invention. Executable algorithms 241 are the executable form of service logic program 506. Upon receiving a transaction capabilities application part message 902, service logic interpreter located in, for example, service control point 104 performs several functions. These functions include decoding, or translation, of transaction capabilities application part message 902, service selection, and service execution.

According to industry standards, transaction capabilities application part message 902 consists of an encoded bitstream specifying a message and its associated parameters. According to one embodiment of the invention, service logic interpreter 224 accesses transaction capabilities application part message definition file 502 to decode transaction capabilities application part message 902. Decoding allows service logic interpreter 224 to know what message was sent, and therefore, what parameters associated with the message to expect. Thus service logic interpreter 224 translates an encoded bitstream specifying a particular message and its associated parameters into a set of fully-qualified names that are understandable by service logic programs 506 and executable algorithms 241. This translation process is illustrated by reference numeral 908.

Once transaction capabilities application part message 902 is translated, service logic interpreter 224 selects an executable algorithm 241 and executes the service independent building blocks associated with the selected executable algorithm. In doing so, service logic interpreter 224 provides the value of a leaf-node parameter to executable algorithm 241 in response to a request by executable algorithm 241 specifying a fully-qualified name for a desired leaf-node parameter. The request incorporating the fully-qualified name is illustrated by reference numeral 909. The provision of a value corresponding to the request 909 is illustrated by reference numeral 910. Because service logic programs 506 were created according to the procedure described with reference to FIGS. 5 through 8, executable algorithm 241 can receive and understand values of parameters specified by a fully qualified name. For example, execution of service independent building block Get 213 gets the value corresponding to a parameter identified by a fully qualified name. Once the value of a parameter is obtained, internal variable names are used within executable algorithm 241. Thus, the fully-qualified name for a parameter allows communication of parameter values between service logic interpreter 224 and executable algorithm 241. Once an executable algorithm 241 has completed its assigned task, a value may be assigned to another parameter associated with transaction capabilities application part message 902 through the service independent block Set 211. This is accomplished by transmitting a fully-qualified name for the parameter and a value to be assigned to that parameter from the executable algorithm 241 to service logic interpreter 224. This transmission of a fully-qualified name and an associated value is illustrated by reference numeral 912. In addition, a response message may be sent utilizing service independent block SendReceive 215.

Once service logic interpreter 224 receives a response from executable algorithm 241, it may translate the message into a bitstream of encoded data for transmission to service switching point 112. This translation is performed in a manner analogous to the translation described above and is represented by reference numeral 908. Once translated, a transaction capabilities application part message response 904 may be transmitted to service switching point 112.

The below Table 1 illustrates one example of a transaction capabilities application part message definition file 502.

TABLE 1

```
####################
Section 1. Protocol
####################
PROTOCOL CUSTOMERNAME 1.0 PRIVATE {
    {25857 AnalyzeRoute      {} {ApplicationError}}
    {28161 Close}
    {25869 Continue {} {ApplicationError}}
    {25859 Disconnect {} {ApplicationError}}
    {25603 InfoAnalyzed {} {ApplicationError FailureReport}
        {AnalyzeRoute Continue SendToResource Disconnect}}
    {28417 ReportError}
    {26113 SendToResource {} {ApplicationError}}
}
####################
Section 2. Messages
####################
SEQUENCE AnalyzeRoute {
    {chargeNumber              19 ChargeNumber OPT}
    {callingPartyID            18 CallingpartyID OPT}
    {calledPartyID             15 CalledPartyID OPT}
    {outpulseNumber            37 OutpulseNumber OPT}
    {primaryTrunkGroup         42 PrimaryTrunkGroup OPT}
    {alternateTrunkGroup        5 AlternateTrunkGroup OPT}
    {secondAlternateTrunkGroup 48 SecondAlternateTrunkGroup OPT}
    {extensionParameter        84 ExtensionParameter OPT}
    {genericAddressList       107 GenericAddressList OPT}
}
SEQUENCE Close {
    {userID             53 UserID OPT}
    {bearerCapability   13 BearerCapability OPT}
    {closeCause         72 CloseCause OPT}
}
{extensionParameter  84 ExtensionParameter OPT} deleted from
Close msg
SEQUENCE Continue {
    {extensionParameter   84 ExtensionParameter OPT}
}
SEQUENCE Disconnect {
    {extensionParameter   84 ExtensionParameter OPT}
}
SEQUENCE InfoAnalyzed {
    {userID             53 UserID}
    {bearerCapability   13 BearerCapability}
    {calledPartyID      15 CalledPartyID OPT}
    {triggerCriteriaType 52 TriggerCriteriaType}
    {chargeNumber       19 ChargeNumber OPT}
    {callingPartyID     18 CallingPartyID OPT}
    {carrier            41 Carrier OPT}
    {accessCode          1 AccessCode OPT}
    {collectedAddressInfo 22 CollectedAddressInfo OPT}
    {collectedDigits    23 CollectedDigits OPT}
    {extensionParameter 84 ExtensionParameter OPT}
}
SEQUENCE ReportError {
    {applicationErrorString   55 ApplicationErrorString}
}
{extensionParameter  84 ExtensionParameter OPT} deleted from
ReportError
SEQUENCE SendToResource {
    {resourceType       45 ResourceType}
    {strParameterBlock  50 StrParameterBlock}
    {disconnectFlag     25 NULL OPT}
    {answerIndicator    12 NULL OPT}
}
{extensionParameter  84 ExtensionParameter OPT} deleted from
SendToResource
RE Ain02RE {
    {1 ApplicationError}
    {2 FailureReport}
}
####################
Section 3. Parameters
####################
3.1 Primitive Parameters
3.1.1 INTEGER
INTEGER ClassOfSvc               0 1023
INTEGER ResourceType             0 255
INTEGER ServTranslationScheme    1 999
3.1.2 BCDOCTSTRING
numbers are no of digits
BCDOCTSTR Dn                     10 10
BCDOCTSTR UniversalAccess        10 10
3.1.3 OBJECTID
The given value is incorrect in the document;
The correct value should be     "1.2.840.113533.8.65.16".
OBJECTID AssignmentAuthority      "1.2.836.97021.8.65.16"
3.1.4 OCTSTRING
numbers are no of bytes
OCTSTR BillSequenceNumber    4 4 # This has been moved to
                                    BITFIELD
OCTSTR CallBranding    2 2
3.1.5 ENUMERATED
ENUM BearerCapability {
    {speech         0}
    {f31kHzaudio    1}
    {f7kHzaudio     2}
    {b56kbps        3}
    {b64kbps        4}
    {multiRate      6}
}
ENUM CallType {
    {onnet          0}
    {offnet         1}
}
ENUM CloseCause {
    {callTerminated              0}
    {eDPsCompleted               1}
    {unexpectedCommunication     2}
    {calledPartyAnswered         3}
}
ENUM ErrorCause {
    {erroneousDataValue          0}
    {missingConditionalParameter 1}
    {responseMessageTimerExpired 2}
    {unexpectedCommunication     3}
    {unexpectedMessage           4}
    {unexpectedMessageSequence   5}
    {unexpectedParameterSequence 6}
}
ENUM FailureCause {
    {rateTooHigh                  1}
    {unavailableResources         2}
    {apTimeout                    3}
    {apbusy                       4}
    {channelsBusy                13}
    {abort                       14}
    {resourceLimitation          15}
    {applicationError            16}
    {securityError               17}
    {protocolError               18}
    {timerExpired                19}
    {temporaryFailure            20}
    {mwiUnderSmdiControl         21}
    {segmentationError           22}
    {ncasDisallowed              23}
    {controlEncountered          24}
    {improperCoding              25}
    {inappropriateCondition      26}
    {inappropriateUserInterface  27}
    {inappropriateLegManipulation 28}
}
ENUM TriggerCriteriaType {
    {featureActivator            0}
    {verticalServiceCode         1}
    {customizedAccess            2}
    {customizedIntercom          3}
    {npa                         4}
    {npaNXX                      5}
    {nxx                         6}
    {nxxXXXX                     7}
    {npaNXXXXXX                  8}
    {countryCodeNPANXXXXXX       9}
    {carrierAccess              10}
    {prefixes                   11}
    {nll                        12}
```

TABLE 1-continued

```
    {aFR                    13}
    {sharedIOTrunk          14}
    {terminationAttempt     15}
    {offHookImmediate       16}
    {offHookDelay           17}
    {channelSetupPRI        18}
    {npaN                   19}
    {npaNX                  20}
    {npaNXXX                21}
    {npaNXXXX               22}
    {npaNXXXXX              23}
    {networkBusy            24}
    {sds_info              100}
    {sds_ani               101}
    {sds_n00               102}
}
3.2 Constructed Parameters
3.2.1 CHOICE
CHOICE StrParameterBlock {
    {announcementBlock   0 AnnouncementBlock}
}
CHOICE UserID {
    {dn         1 Dn}
}
3.2.2 SEQUENCE
SEQUENCE AnnouncementBlock {
    {uninterAnnounceBlock 1 UninterAnnounceBlock OPT}
}
SEQUENCE ApplicationError {
    {applicationErrorString 55 ApplicationErrorString}
}
{extensionParameter 84 ExtensionParameter OPT} deleted from
ApplicationError
SEQUENCE ExtensionParameter {
    {assignmentAuthority {6 UNIVERSAL} AssignmentAuthority}
    {epParameters {17 UNIVERSAL} EpParameters}
}
SEQUENCE FailureReport {
    {failureCause      32 FailureCause}
}
{extensionParameter 84 ExtensionParameter OPT} deleted from
FailureReport
SEQUENCE ApplicationErrorString {
    {errorCause      56 ErrorCause}
}
3.2.3 SEQUENCEOF
SEQUENCEOF GenericAddressList 10 GenericAddress 80
SEQUENCEOF UninterAnnounceBlock 10 AnnounceElement
{4 UNIVERSAL}
3.2.4 SET
SET EpParameters {
    {servTranslationScheme   1 ServTranslationScheme OPT}
    {callType                2 CallType OPT}
    {satRestriction          3 NULL OPT}
    {classOfSvc              4 ClassOfSvc OPT}
    {billSequenceNumber      9 BillSequenceNumber OPT}
    {callBranding            5 CallBranding OPT}
    {universalAccess        10 UniversalAccess OPT}
}
3.3 User Defined Parameters
USER_DEFINE AccessCode                       AINDigits
USER_DEFINE CalledPartyID                    AINDigits
USER_DEFINE CallingPartyID                   AINDigits
USER_DEFINE ChargeNumber                     AINDigits
USER_DEFINE CollectedAddressInfo             AINDigits
USER_DEFINE CollectedDigits                  AINDigits
USER_DEFINE OutpulseNumber                   AINDigits
USER_DEFINE AlternateTrunkGroup              TrunkGroupType
USER_DEFINE PrimaryTrunkGroup                TrunkGroupType
USER_DEFINE SecondAlternateTrunkGroup        TrunkGroupType
USER_DEFINE Carrier   CarrierFormat

3.4 Bitfield Parameters
BITFIELD AINDigits {
    {odd_even      BIT_DGT_ODDEVEN    1        }
    {nat_of_num    BIT_ENUM           7        }
    {spare         BIT_NULL           1        }
    {num_plan      BIT_ENUM           3        }
    {pri           BIT_ENUM           2        }
    {si            BIT_ENUM           2        }
    {digits        BIT_DGT            0 24 odd_even }
}
AINDigits FIELD DEFINITION START ----
BIT_ENUM AINDigits nat_of_num {
    {not_applicable              0}
    {subscriber_number           1}
    {reserved_for_national_use   2}
    {national_number             3}
    {international_number        4}
    {partitioned_number         96}
    {acct_number                97}
    {ani_number                 98}
    {i2ani_number               99}
    {authcode_number           100}
    {hotline_number            101}
    {mccs_number               102}
    {pin_number                103}
    {vpn_number                104}
    {n00_number                105}
}
BIT_ENUM AINDigits num_plan {
    {unknown_or_not_applicable   0}
    {isdn_numbering_plan         1}
    {private_numbering_plan      5}
}
BIT_ENUM AINDigits pri {
    {presentation_allowed        0}
    {presentation_restricted     1}
    {number_unavaliable          2}
}
BIT_ENUM AINDigits si {
    {reserved_for_user_provided                              0}
    {user_provided_passed_network_screening                  1}
    {reserved_for_user_privated_failed_network_screening     2}
}
---- AINDigits FIELD DEFINITION END
number of digits is determined by filed num_of_digits
BITFIELD AnnounceElement {
    {system_announcement_id   BIT_INT               16}
    {number_of_digits         BIT_DGT_NUMDIGITS      8}
    {digits                   BIT_DGT                 }
}
BIT_INT AnnounceElement system_announcement_id 0 65535 100
BITFIELD BillSequenceNumber {
    {scp_num       BIT_INT    2}
    {instance_num  BIT_INT    6}
    {serial_num    BIT_INT   24}
}
BITFIELD CarrierFormat {
    {carrier_selection  BIT_ENUM              8}
    {number_of_digits   BIT_DGT_NUMDIGITS     8}
    {digits             BIT_DGT               4 4
                                              number_of_digits}
}
BIT_ENUM CarrierFormat carrier_selection {
    {no_indication                                   0}
    {presubscribed_and_no_input                      1}
    {presubscribed_and_input                         2}
    {presubscribed_and_no_indication_ofinput         3}
    {not_presubscribed_and_input                     4}
}
BITFIELD GenericAddress {
    {type_of_addr     BITE_NUM               8}
    {odd_even         BIT_DGT_ODDEVEN        1}
    {nat_of_addr_ind  BIT_ENUM               7}
    {spare            BIT_NULL               1}
    {num_plan         BIT_ENUM               3}
    {pres             BIT_ENUM               2}
    {resv             BIT_NULL               2}
    {addr_signal      BIT_DGT                1 16 odd_even}
}
GenericAddress FIELD DEFINITION START ----
#BIT_ENUM GenericAddress type_of_addr {
#   {dialed_num                                  0}
#   {destination_num                             1}
#   {suppl_user_prov_calling_addr_failed_scr     2}
#   {suppl_user_prov_calling_addr_not_scr        3}
#   {completion_num                              4}
```

TABLE 1-continued

```
# {alternate_outpulse_num           100}
# {second_alternate_outpulse_num    101}
# {overflow_routing_num             102}
#}
BIT_ENUM GenericAddress type_of_addr {
    {alternate_outpulse_num          96}
    {second_alternate_outpulse_num   97}
    {overflow_routing_num            98}
}
# changed unique_international_num from 5 to 4
# added vpn        104
BIT_ENUM GenericAddress nat_of_addr_ind {
    {unique_subscriber_num           1}
    {unique_national_num             3}
    {unique_international_num        4}
    {abbreviated_num                 6}
    {vpn                           104}
    {non_unique_subscriber_num     113}
    {non_unique_national_num       115}
    {non_unique_international_num  116}
    {test_line_test_code           119}
}
BIT_ENUM GenericAddress num_plan {
    {isdn_num_plan                   1}
    {private                         5}
}
BIT_ENUM GenericAddress pres {
    {presentation_allowed            0}
    {presentation_restricted         1}
}
---- GenericAddress FIELD DEFINITION END
TrunkGroupType call_treat_ind is chosen as BIT_NULL because it
is for future use.
BITFIELD TrunkGroupType {
    {no_to_outpulse   BIT_ENUM  1}
    {sfg_ind          BIT_ENUM  1}
    {call_treat_ind   BIT_NULL  6}
    {digits           BIT_DGT  8 8}
}
TrunkGroupType FIELD DEFINITION START ----
BIT_ENUM TrunkGroupType no_to_outpulse {
    {outpulse_no         0}
    {normal_routing_no   1}
}
BIT_ENUM TrunkGroupType sfg_ind {
    {not_sfg   0}
    {sfg       1}
}
---- TrunkGroupType FIELD DEFINITION END
3.4 BIT_MAP
BCD_MAP {
    {0   0}
    {1   1}
    {2   2}
    {3   3}
    {4   4}
    {5   5}
    {6   6}
    {7   7}
    {8   8}
    {9   9}
    {13  *}
    {14  #}
    {15  S}
}
```

The below Table 2 illustrates one example of a "dot" file listing fully-qualified names of leaf-node parameters contained in the transaction capabilities application part message definition file of Table 1.

TABLE 2

```
->TMD for CUSTOMERNAME 1.0 <- ####
::INVOKE

```

TABLE 2-continued

```
Operation Name: AnalyzeRoute
chargeNumber.odd_even
chargeNumber.nat_of_num
chargeNumber.spare
chargeNumber.num_plan
chargeNumber.pri
chargeNumber.si
chargeNumber.digits
callingPartyID.odd_even
callingPartyID.nat_of_num
callingPartyID.spare
callingPartyID.num_plan
callingPartyID.pri
callingPartyID.si
callingPartyID.digits
calledPartyID.odd_even
calledPartyID.nat_of_num
calledPartyID.spare
calledPartyID.num_plan
calledPartyID.pri
calledPartyID.si
calledPartyID.digits
outpulseNumber.odd_even
outpulseNumber.nat_of_num
outpulseNumber.spare
outpulseNumber.num_plan
outpulseNumber.pri
outpulseNumber.si
outpulseNumber.digits
primaryTrunkGroup.no_to_outpulse
primaryTrunkGroup.sfg_ind
primaryTrunkGroup.call_treat_ind
primaryTrunkGroup.digits
alternateTrunkGroup.no_to_outpulse
alternateTrunkGroup.sfg_ind
alternateTrunkGroup.call_treat_ind
alternateTrunkGroup.digits
secondAlternateTrunkGroup.no_to_outpulse
secondAlternateTrunkGroup.sfg_ind
secondAlternateTrunkGroup.call_treat_ind
secondAlternateTrunkGroup.digits
extensionParameter.assignmentAuthority
extensionParameter.epParameters.servTranslationScheme
extensionParameter.epParameters.callType
extensionParameter.epParameters.satRestriction
extensionParameter.epParameters.classOfSvc
extensionParameter.epParameters.billSequenceNumber.scp_num
extensionParameter.epParameters.billSequenceNumber.instance_num
extensionParameter.epParameters.billSequenceNumber.serial_num
extensionParameter.epParameters.callBranding
extensionParameter.epParameters.universalAccess
genericAddressList(0).GenericAddress.type_of_addr
genericAddressList(0).GenericAddress.odd_even
genericAddressList(0).GenericAddress.nat_of_addr_ind
genericAddressList(0).GenericAddress.spare
genericAddressList(0).GenericAddress.num_plan
genericAddressList(0).GenericAddress.pres
genericAddressList(0).GenericAddress.resv
genericAddressList(0).GenericAddress.addr_signal
genericAddressList(1).GenericAddress.type_of_addr
genericAddressList(1).GenericAddress.odd_even
genericAddressList(1).GenericAddress.nat_of_addr_ind
genericAddressList(1).GenericAddress.spare
genericAddressList(1).GenericAddress.num_plan
genericAddressList(1).GenericAddress.pres
genericAddressList(1).GenericAddress.resv
genericAddressList(1).GenericAddress.addr_signal
genericAddressList(2).GenericAddress.type_of_addr
genericAddressList(2).GenericAddress.odd_even
genericAddressList(2).GenericAddress.nat_of_addr_ind
genericAddressList(2).GenericAddress.spare
genericAddressList(2).GenericAddress.num_plan
genericAddressList(2).GenericAddress.pres
genericAddressList(2).GenericAddress.resv
genericAddressList(2).GenericAddress.addr_signal
genericAddressList(3).GenericAddress.type_of_addr
genericAddressList(3).GenericAddress.odd_even
genericAddressList(3).GenericAddress.nat_of_addr_ind
genericAddressList(3).GenericAddress.spare
```

TABLE 2-continued genericAddressList(3).GenericAddress.num_plan
genericAddressList(3).GenericAddress.pres
genericAddressList(3).GenericAddress.resv
genericAddressList(3).GenericAddress.addr_signal
genericAddressList(4).GenericAddress.type_of_addr
genericAddressList(4).GenericAddress.odd_even
genericAddressList(4).GenericAddress.nat_of_addr_ind
genericAddressList(4).GenericAddress.spare
genericAddressList(4).GenericAddress.num_plan
genericAddressList(4).GenericAddress.pres
genericAddressList(4).GenericAddress.resv
genericAddressList(4).GenericAddress.addr_signal
genericAddressList(5).GenericAddress.type_of_addr
genericAddressList(5).GenericAddress.odd_even
genericAddressList(5).GenericAddress.nat_of_addr_ind
genericAddressList(5).GenericAddress.spare
genericAddressList(5).GenericAddress.num_plan
genericAddressList(5).GenericAddress.pres
genericAddressList(5).GenericAddress.resv
genericAddressList(5).GenericAddress.addr_signal
genericAddressList(6).GenericAddress.type_of_addr
genericAddressList(6).GenericAddress.odd_even
genericAddressList(6).GenericAddress.nat_of_addr_ind
genericAddressList(6).GenericAddress.spare
genericAddressList(6).GenericAddress.num_plan
genericAddressList(6).GenericAddress.pres
genericAddressList(6).GenericAddress.resv
genericAddressList(6).GenericAddress.addr_signal
genericAddressList(7).GenericAddress.type_of_addr
genericAddressList(7).GenericAddress.odd_even
genericAddressList(7).GenericAddress.nat_of_addr_ind
genericAddressList(7).GenericAddress.spare
genericAddressList(7).GenericAddress.num_plan
genericAddressList(7).GenericAddress.pres
genericAddressList(7).GenericAddress.resv
genericAddressList(7).GenericAddress.addr_signal
genericAddressList(8).GenericAddress.type_of_addr
genericAddressList(8).GenericAddress.odd_even
genericAddressList(8).GenericAddress.nat_of_addr_ind
genericAddressList(8).GenericAddress.spare
genericAddressList(8).GenericAddress.num_plan
genericAddressList(8).GenericAddress.pres
genericAddressList(8).GenericAddress.resv
genericAddressList(8).GenericAddress.addr_signal
genericAddressList(9).GenericAddress.type_of_addr
genericAddressList(9).GenericAddress.odd_even
genericAddressList(9).GenericAddress.nat_of_addr_ind
genericAddressList(9).GenericAddress.spare
genericAddressList(9).GenericAddress.num_plan
genericAddressList(9).GenericAddress.pres
genericAddressList(9).GenericAddress.resv
genericAddressList(9).GenericAddress.addr_signal
Operation Name: Close
userID.dn
bearerCapability
closeCause
Operation Name: Continue
extensionparameter.assignmentAuthority
extensionParameter.epParameters.servTranslationScheme
extensionParameter.epParameters.callType
extensionParameter.epParameters.satRestriction
extensionParameter.epParameters.classOfSvc
extensiorParameter.epParameters.billSequenceNumber.scp_num
extensionParameter.epParameters.billSequenceNumber.instance_num
extensionParameter.epParameters.billSequenceNumber.serial_num
extensionParameter.epParameters.callBranding
extensionParameter.epParameters.universalAccess
Operation Name: Disconnect
extensionParameter.assignmentAuthority
extensionParameter.epParameters.servTranslationScheme
extensionParameter.epParameters.callType
extensionParameter.epParameters.satRestriction
extensionParameter.epParameters.classOfSvc
extensionParameter.epParameters.billsequenceNumber.scp_num
extensionParameter.epParameters.billSequenceNumber.instance_num
extensionParameter.epParameters.billSequenceNumber.serial_num
extensionParameter.epParameters.callBranding
extensionParameter.epParameters.universalAccess
Operation Name: InfoAnalyzed TABLE 2-continued userID.dn
bearerCapability
calledPartyID.odd_even
calledPartyID.nat_of_num
calledPartyID.spare
calledPartyID.num_plan
calledPartyID.pri
calledPartyID.si
calledPartyID.digits
triggerCriteriaType
chargeNumber.odd_even
chargeNumber.nat_of_num
chargeNumber.spare
chargeNumber.num_plan
chargeNumber.pri
chargeNumber.si
chargeNumber.digits
callingPartyID.odd_even
callingPartyID.nat_of_num
callingPartyID.spare
callingPartyID.num_plan
callingPartyID.pri
callingPartyID.si
callingPartyID.digits
carrier.carrier_selection
carrier.number_of_digits
carrier.digits
accessCode.odd_even
accessCode.nat_of_num
accessCode.spare
accessCode.num_plan
accessCode.pri
accessCode.si
accessCode.digits
collectedAddressInfo.odd_even
collectedAddressInfo.nat_of_num
collectedAddressInfo.spare
collectedAddressInfo.num_plan
collectedAddressInfo.pri
collectedAddressInfo.si
collectedAddressInfo.digits
collectedDigits.odd_even
collectedDigits.nat_of_num
collectedDigits.spare
collectedDigits.num_plan
collectedDigits.pri
collectedDigits.si
collectedDigits.digits
extensionParameter.assignmentAuthority
extensionParameter.epParameters.servTranslationScheme
extensionParameter.epParameters.callType
extensionParameter.epParameters.satRestriction
extensionParameter.epParameters.classOfSvc
extensionParameter.epParameters.billSequenceNumber.scp_num
extensionParameter.epParameters.billSequenceNumber.instance_num
extensionParameter.epParameters.billSequenceNumber.serial_num
extensionParameter.epParameters.callBranding
extensionParameter.epParameters.universalAccess
Operation Name: ReportError
applicationErrorString.errorCause
Operation Name: SendToResource
resourceType
strParameterBlock.announcementBlock.uninterAnnounceBlock(0).AnnounceElement.system_announcement_id
strParameterBlock.announcementBlock.uninterAnnounceBlock(0).AnnounceElement.number_of_digits
strParameterBlock.announcementBlock.uninterAnnounceBlock(0).AnnounceElement.digits
strParameterBlock.announcementBlock.uninterAnnounceBlock(1).AnnounceElement.system_announcement_id
strParameterBlock.announcementBlock.uninterAnnounceBlock(1).AnnounceElement.number_of_digits
strParameterBlock.announcementBlock.uninterAnnounceBlock(1).AnnounceElement.digits
strParameterBlock.announcementBlock.uninterAnnounceBlock(2).AnnounceElement.system_announcement_id
strParameterBlock.announcementBlock.uninterAnnounceBlock(2).AnnounceElement.number_of_digits
strParameterBlock.announcementBlock.uninterAnnounce TABLE 2-continued

```
Block(2).AnnounceElement.digits
strParameterBlock.announcementBlock.uninterAnnounce
Block(3).AnnounceElement.system_announcement_id
strParameterBlock.announcementBlock.uninterAnnounce
Block(3).AnnounceElement.number_of_digits
strParameterBlock.announcementBlock.uninterAnnounce
Block(3).AnnounceElement.digits
strParameterBlock.announcementBlock.uninterAnnounce
Block(4).AnnounceElement.system_announcement_id
strParameterBlock.announcementBlock.uninterAnnounce
Block(4).AnnounceElement.number_of_digits
strParameterBlock.announcementBlock.uninterAnnounce
Block(4).AnnounceElement.digits
strParameterBlock.announcementBlock.uninterAnnounce
Block(5).AnnounceElement.system_announcement_id
strParameterBlock.announcementBlock.uninterAnnounce
Block(5).AnnounceElement.number_of_digits
strParameterBlock.announcementBlock.uninterAnnounce
Block(5).AnnounceElement.digits
strParameterBlock.announcementBlock.uninterAnnounce
Block(6).AnnounceElement.system_announcement_id
strParameterBlock.announcementBlock.uninterAnnounce
Block(6).AnnounceElement.number_of_digits
strParameterBlock.announcementBlock.uninterAnnounce
Block(6).AnnounceElement.digits
strParameterBlock.announcementBlock.uninterAnnounce
Block(7).AnnounceElement.system_announcement_id
strParameterBlock.announcementBlock.uninterAnnounce
Block(7).AnnounceElement.number_of_digits
strParameterBlock.announcementBlock.uninterAnnounce
Block(7).AnnounceElement.digits
strParameterBlock.announcementBlock.uninterAnnounce
Block(8).AnnounceElement.system_announcement_id
strParameterBlock.announcementBlock.uninterAnnounce
Block(8).AnnounceElement.number_of_digits
strParameterBlock.announcementBlock.uninterAnnounce
Block(8).AnnounceElement.digits
strParameterBlock.announcementBlock.uninterAnnounce
Block(9).AnnounceElement.system_announcement_id
strParameterBlock.announcementBlock.uninterAnnounce
Block(9).AnnounceElement.number_of_digits
strParameterBlock.announcementBlock.uninterAnnounce
Block(9).AnnounceElement.digits
disconnectFlag
answerIndicator
::RR

::RE

Operation Name: ApplicationError
applicationErrorString.errorCause
Operation Name: FailureReport
failureCause
```

Although the present invention and its advantages have been described in detail, it should be understood that various changes, substitutions, and alterations may be made therein without departing from the spirit and scope of the invention as defined by the appended claims.

What is claimed is:

1. A method of processing transaction capabilities application part information in an intelligent network, the method comprising the steps of:

transmitting transaction capabilities application part information from a first node in the intelligent network to a second node in the intelligent network;

providing a transaction capabilities application part message definition having a plurality of messages and parameters defining a parameter structure for transaction capabilities application part communication;

accessing the transaction capabilities application part message definition to determine the parameter structure for the transaction capabilities application part information;

linking selected instances of service independent building blocks to form a service logic program, in response to the content of the transaction capabilities application part information and the parameter structure;

converting the service logic program into an executable algorithm; and executing the executable algorithm operable to process transaction capabilities application part messages having the parameter structure defined by the transaction capabilities application part message definition.

2. The method of claim 1 wherein the provided transaction capabilities application part message definition comprises a coded transaction capabilities application part message and further comprising decoding the coded transaction capabilities application part message based on the content of the transaction capabilities application part message definition.

3. The method of claim 1 and further comprising encoding transaction capabilities application part information based on the content of the transaction capabilities application part message definition in response to the step of executing an executable algorithm, the encoded transaction capabilities application part information for transmission from the second node to the first node.

4. The method of claim 1 wherein the executable algorithm is operable to receive and transmit parameters specified by a fully qualified name, the parameters defined by the transaction capabilities application part message definition.

5. The method of claim 1 and further comprising selecting the executable algorithm in response to the content of the transaction capabilities application part information.

6. The method of claim 1 wherein the step of executing the executable algorithm comprises executing the executable algorithm having portions derived from the transaction capabilities application part message definition.

7. A method of processing transaction capabilities application part information in an intelligent network, the method comprising the steps of:

transmitting transaction capabilities application part information from a first node in the intelligent network to a second node in the intelligent network;

providing a transaction capabilities application part message definition having a plurality of messages and parameters defining a parameter structure for transaction capabilities application part communication;

accessing the transaction capabilities application part message definition to determine the parameter structure for the transaction capabilities application part information; and in response to the content of the transaction capabilities application part information and the parameter structure, executing an executable algorithm operable to process transaction capabilities application part messages having the parameter structure defined by the transaction capabilities application part message definition, wherein the step of executing an executable algorithm comprises executing an executable algorithm adapted to associate a leaf-node parameter derived from the transaction capabilities application part message definition with a variable internal to the executable algorithm.

8. A method of communicating transaction capabilities application part information between at least two nodes of an intelligent network, the method comprising the steps of:

transmitting coded transaction capabilities application part information from a first node of the intelligent network to a second node of the intelligent network, the coded transaction capabilities application part information having a code corresponding to a transmitted transaction capabilities application part message and a code corresponding to a parameter associated with the transmitted transaction capabilities application part message;

accessing from the second node a transaction capabilities application part message definition;

decoding the coded transaction capabilities application part information in response to accessing the transaction capabilities application part message definition to produce decoded transaction capabilities application part information, the decoded transaction capabilities application part information comprising a decoded transaction capabilities application part message and a decoded parameter associated with the decoded transaction capabilities application part message; and executing an executable algorithm in response to the decoded transaction capabilities application part message.

9. The method of claim 8 and further comprising encoding transaction capabilities application part information in response to the step of executing an executable algorithm.

10. The method of claim 9 wherein the step of encoding transaction capabilities application part information comprises encoding transaction capabilities application part information based on the content of the transaction capabilities application part message definition.

11. The method of claim 8 wherein the step of executing an executable algorithm comprises selecting an executable algorithm for execution, the selection of the executable algorithm based on the decoded transaction capabilities application part message.

12. The method of claim 8 wherein the step of executing an executable algorithm comprises executing an executable algorithm derived from a plurality of service independent building blocks.

13. The method of claim 8 wherein the step of executing an executable algorithm comprises executing a service independent building block adapted to associate a leaf-node parameter derived from the transaction capabilities application part message definition with a variable within the service independent building block.

14. The method of claim 8 wherein the decoded parameter is identified by a fully qualified name.

15. The method of claim 8 and further comprising transmitting a value for a parameter specified by the fully qualified name to the executable algorithm.

16. The method of claim 8 and further comprising receiving at a service logic interpreter in the second node a fully-qualified name associated with a leaf-node parameter and receiving at the executable algorithm a value corresponding to the leaf-node parameter.

17. The method of claim 16 and further comprising assigning a value corresponding to the leaf-node parameter to a variable in the executable algorithm.

18. The method of claim 8 and further comprising transmitting coded transaction capabilities application part information from the second node to the first node in response to executing the executable algorithm for transmission from the second node to the first node.

19. The method of claim 18 and further comprising coding a parameter associated with a transaction capabilities application part message in response to executing the executable algorithm for transmission from the second node to the first node.

20. The method of claim 19 wherein the parameter is specified by a fully-qualified name.

21. A communications network comprising:

a transaction capabilities application part message definition defining a transaction capabilities application part parameter structure;

a first node in the communications network; and a second node in the communications network, the second node in communication with the first node, the second node comprising a service logic interpreter operable to:
receive a transaction capabilities application part message from the first node;
access the transaction capabilities application part message definition;
link selected instances of service independent building blocks to form a service logic program based on the content of the transaction capabilities application part message definition;
convert the service logic program into an executable algorithm, the executable algorithm having a parameter structure defined by the transaction capabilities application part message definition; and
execute the executable algorithm to process the transaction capabilities application part message.

22. The communications network of claim 21 wherein the service logic interpreter is further operable to translate the transaction capabilities application part message into a form understandable by the executable algorithm.

23. The communications network of claim 21 wherein the transaction capabilities application part message definition associates a coded transaction capabilities application part message with a decoded transaction capabilities application part message.

24. The communications network of claim 21 wherein the service logic interpreter is further operable to translate the transaction capabilities application part message based on the transaction capabilities application part message definition.

25. A communications network comprising:

a transaction capabilities application part message definition defining a transaction capabilities application part parameter structure;

a first node in the communications network; and a second node in the communications network, the second node in communication with the first node, the second node comprising a service logic interpreter operable to:
receive transaction capabilities application part messages from the first node;
access the transaction capabilities application part message definition;
select an executable algorithm for execution based on the content of the transaction capabilities application part message definition, the executable algorithm having a parameter structure defined by the transaction capabilities application part message definition; and
execute the executable algorithm, wherein the executable algorithm is operable to receive and transmit information by transmitting to the service logic interpreter fully qualified names specifying leaf-node parameters having the parameter structure defined by the transaction capabilities application part message definition.

* * * * *